Nov. 2, 1926.

Re. 16,454

E. B. NELSON ET AL

DISPLAY CASE

Original Filed Oct. 19, 1922 2 Sheets-Sheet 1

Witness

C. [illegible]

Inventors

Ernest B. Nelson,
James T. Findlay

By H. B. Willson & Co

Attorneys

Nov. 2, 1926.

Re. 16,454

E. B. NELSON ET AL

DISPLAY CASE

Original Filed Oct. 19, 1922 2 Sheets-Sheet 2

Witness

Inventors

Ernest B. Nelson,
James T. Findlay

By A. B. Willson & Co.

Attorneys

Reissued Nov. 2, 1926. Re. 16,454

UNITED STATES PATENT OFFICE.

ERNEST B. NELSON AND JAMES T. FINDLAY, OF ABILENE, KANSAS.

DISPLAY CASE.

Original No. 1,551,765, dated September 1, 1925, Serial No. 595,581, filed October 19, 1922. Application for reissue filed July 1, 1926. Serial No. 119,980.

Our invention relates to improvements in cases for displaying numerous kinds of produce in grocery and other stores and has for its object to provide a simple and inexpensive device in which the container is normally closed tightly by a cover which is movable to an inoperative position, simply by tilting the container in a predetermined manner.

More specifically speaking, we propose to provide a display case which is pivotally mounted on a suitable support to permit it to be disposed in a forwardly declined position when its contents are being displayed or to permit it to be tilted and declined rearwardly when the contents are being removed, the cover serving to entirely close and remain in a closed state when the container is in the first named position and automatically moving to a position to uncover one end of the container when it is in its discharging position.

A further object is to pivot a plate in one end of the container so that it may normally fold into the latter for the purpose of displaying information relating to its contents, but may be swung outwardly to extend above the end wall of the container when the latter is tilted in one direction, thereby preventing the contents from running over said end wall as they slide downwardly towards the same.

With the foregoing in view, the invention resides in the novel subject matter hereinafter described and claimed, the description being supplemented by the accompanying drawings.

Figure 2:
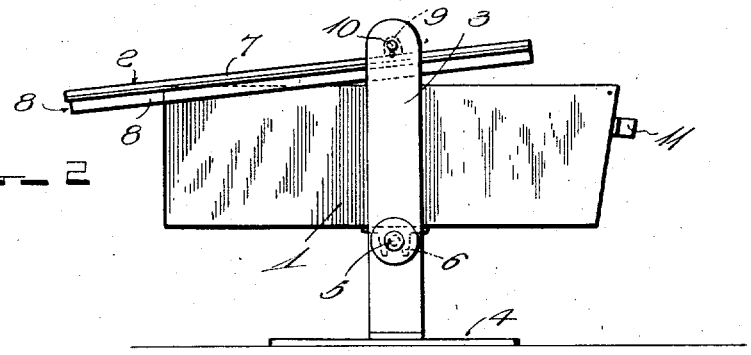
Figure 2 is a view similar to Fig. 1 showing the manner in which the cover and container slide relatively when the latter is tilted.
Figure 3:
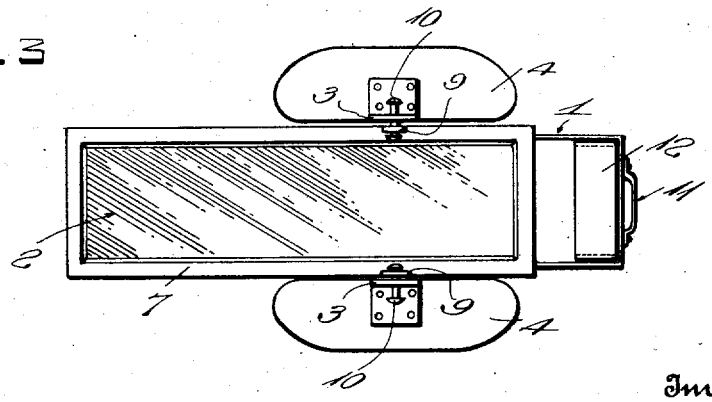
Figure 3 is a top plan view with the parts in the positions shown in Fig. 2.

In carrying out our invention, we make use of a container 1 which is pivoted between its ends on a horizontal axis and we provide a cover 2 for the container 1 which rests slidably upon the same, said cover being pivoted, on an axis parallel with and spaced above the pivot of the container 1, to a suitable part which is stationary with respect to the cover and container. By this arrangement, when the container is tilted from the position at which it is completely closed by the cover 2, this cover will slide upon the container to an open position, as will be clear by reference to Figs. 2 and 5.

In the preferred form of construction, we mount the container and its cover between a pair of vertical standards 3 which may well rise from a pair of horizontal plates 4, adapted to rest upon a floor, store counter, or other suitable support. A rod 5 extends horizontally between the lower ends of the standards 3 and the lower side of the container 1 which is of elongated form, is provided with a pair of downwardly opening bearing seats 6. This arrangement effectively supports the container 1 pivotally and permits said container to be readily removed for cleaning purposes.

The cover 2 preferably consists of a glass plate held within an appropriate frame 7 which rests upon the upper edge of the container 1, the two parallel sides and one end of this frame being provided with depending flanges 8 which engage the outer side of the container to form a tight connection. The other end of the frame is not provided with a flange, in view of the fact that it must slide inwardly upon the container.

Figure 1:
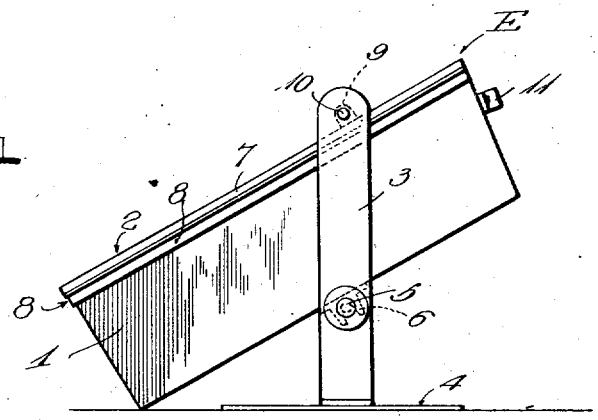
Figure 1 is a side elevation of a display device constructed in accordance with our invention.
Figure 4:
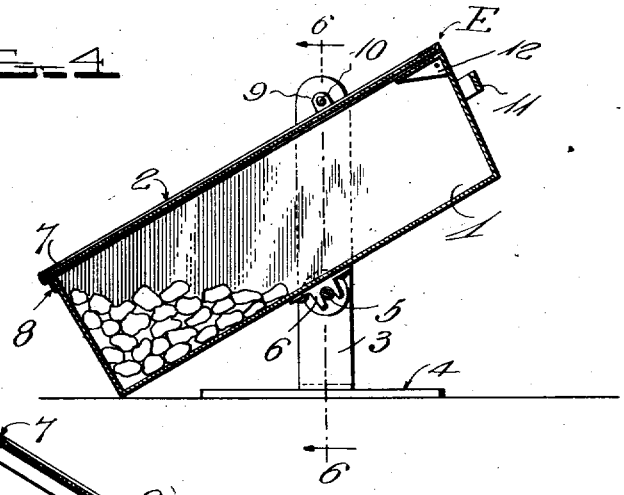
Figure 4 is a longitudinal sectional view with the parts in the positions shown in Fig. 1.
Figure 5:
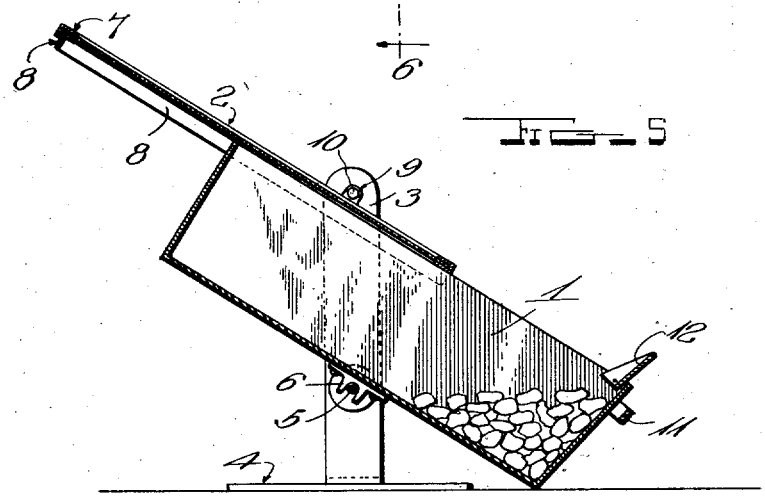
Figure 5 is a longitudinal sectional view showing the cover open to expose the contents of the receptacle for removal.

The sides of the frame are provided near one end, in the present showing, with upstanding ears 9, which are pivoted to the upper ends of the standards 3 by rivets or the like 10. The space between the pivots 10 and the pivot rod 5 is such as to hold the cover 2 in tight contact with the container 1 when these parts are tilted to the limit in one direction, as shown in Figs. 1 and 4. When the device is in this position, its contents may readily be viewed through the glass cover 2 and whenever any of these contents are to be removed, it is simply necessary to tilt the container in the opposite direction as seen in Fig. 5, for which purpose it may well be provided with a suitable handle 11. Tilting in this manner, causes relative sliding of the container and cover so that the latter is moved to an open position as disclosed in Fig. 5.

It is obvious from the foregoing description that we have evolved and produced an extremely practical and advantageous display case, due mainly to the fact that customers standing in front of the case will not be permitted to lift the cover and insert their hands into the container for removing any of the contents. Hence, the articles within the container cannot be soiled from this source, nor can the cover be left accidentally open while in display to permit the accumulation of dirt within the container. Consequently, the improved structure is exceedingly sanitary. On the other hand, as soon as the container is tilted rearwardly, the then lower end of the cover will automatically uncover the corresponding end of the container to permit access to be had to the interior.

Pivoted within one end of the container 1, is a plate 12 which is normally folded into the container beneath its glass cover 2 as shown in Fig. 4, in which position it may well display the price of the contents of the container or other information relating thereto. When the container is tilted to the open position disclosed in Fig. 5, the plate 12 is swung upwardly to extend above the end of said container, thereby preventing the contents from rolling over this end as they slide towards the same.

Figure 6:
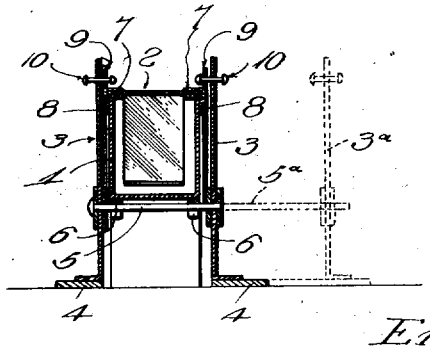
Figure 6 is a vertical transverse section as indicated by line 6—6 of Fig. 4.
Figure 7:
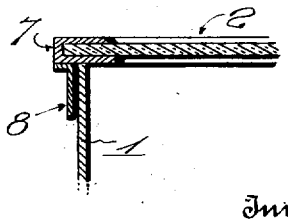
Figure 7 is an enlarged detail longitudinal section through one end of the cover and the adjacent end wall of the container.

Any number of the devices may be placed side by side as will be clear by reference to Fig. 6, in which the numeral $3^a$ designates an additional standard spaced from one of the standards 3. The dotted lines $5^a$ in this figure show that the pivot rod 5 may be extended to support any desired number of the containers.

Attention is directed to the fact that the distance between the cover pivot means 10 and the rear end E of the cover, measured on a direct or straight line, is considerably less than the direct distance from the container pivot means 5 to said rear end E, these measurements being being taken when the cover is closed as shown in Figs. 1 and 4. Moreover, attention is invited to the fact that the pivot means $10^5$ are spaced vertically a fixed distance from each other, that is, in the present disclosure, they connect the cover and the container with portions of the standards 3 which are relatively immovable. This greatly simplifies the construction over one in which some other arrangement might be employed. We further invite attention to the fact that whereas the principal use of the invention is to display goods in one of its positions, that is an inclined position, in most cases, the novel arrangement of container, cover, and pivots, could well be used in a device in which no actual display of contents is permitted and in which one position of the container need not necessarily be an inclined position.

Excellent results may be obtained from the details disclosed and hence they may be followed if desired. However, within the scope of the invention as claimed, numerous minor changes may be made and it will be understood that while we prefer to provide our invention with a transparent cover for display purposes, a cover of any other desired form may be used.

What is claimed is:—

1. A device of the class described comprising a support, an open top container pivoted below its top and between its ends to said support to swing from a forwardly declined display position to a rearwardly declined discharge position, and a cover slidable upon the open top of said container and pivoted to said support at a point above the pivot of said container, the pivot of said cover being closer to the rear end thereof than the pivot of said container is to said rear end of said cover, so that said cover will be closed while said container is in its forwardly declined display position but will slide so as to uncover the rear end portion of said container when the latter is swung to its rearwardly declined discharge position.

2. A device of the class described comprising a support, an open top container pivoted below its top and between its ends to said support to swing from a forwardly declined display position to a rearwardly declined discharge position, and a cover slidable upon the open top of said container and pivoted to said support at a point between its ends and spaced a fixed distance above the pivot of said container, the pivot of said cover being closer to the rear end thereof than the pivot of said container is to said rear end of said cover, so that said cover will be closed while said container is in its forwardly declined display position but will slide so as to uncover the rear end portion of said container when the latter is swung to its rearwardly declined discharge position.

3. In combination, a container, a cover for said container engaged slidably therewith, pivot means disposed at different relatively fixed elevations and located between the ends of the container and cover to pivot said container and cover for swinging from a container-closed position to a container-open position, the direct distance from the cover's pivotal axis to one end of said cover being less than the direct distance from the container's pivotal axis to said one end of the cover, causing relative sliding of the container and cover as they are jointly swung upon said pivotal axes.

4. In combination, a supporting structure, a container, a cover for said container engaged slidably therewith, pivot means disposed at different elevations and pivoting said container and cover to portions of the supporting means fixed against relative movement during opening or closing of the container, said container and cover being swingable upon their pivotal axes from a container-closed position to a container-open position, the direct distance from the cover's pivotal axis to one end of said cover being less than the direct distance from the container's pivotal axis to said one end of the cover, causing relative sliding of the container and cover as they are jointly swung upon said pivotal axes.

In testimony whereof we have hereunto affixed our signatures.

ERNEST B. NELSON.
JAMES T. FINDLAY.